March 17, 1931.  E. H. COQUILLE  1,796,748
TESTING DEVICE FOR TRUNKS
Filed Oct. 25, 1928
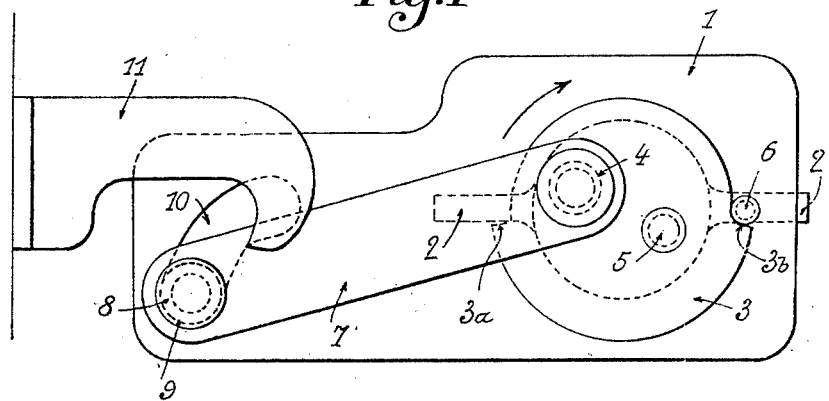
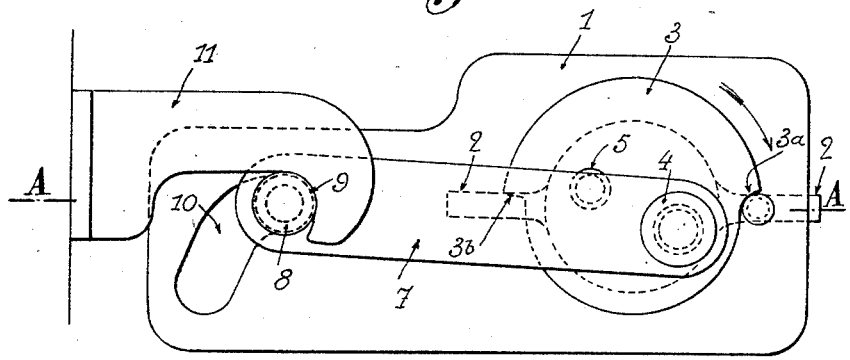
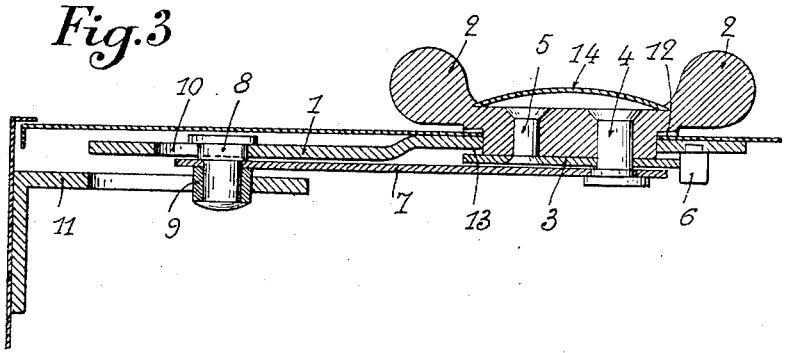
E. H. Coquille
INVENTOR
By: Marks & Clerk
Attys.

Patented Mar. 17, 1931

1,796,748

UNITED STATES PATENT OFFICE

EMILE HENRI COQUILLE, OF PARIS, FRANCE

FASTENING DEVICE FOR TRUNKS

Application filed October 25, 1928, Serial No. 315,084, and in France November 21, 1927.

The present invention has for its object a fastening device for trunks, chests, boxes, motor vehicle hoods and the like, which is chiefly characterized in that the fastening element consists of a link which is mounted at one end on an eccentric crank disc provided with actuating means and rotatable in a suitable recess in a plate secured to the trunk or chest lid. At the other end the said link comprises a stud which enters, when the trunk or the like is closed, in a hook secured to the lid or the door to be closed. The said stud is guided, when its link is moved, by the action of the said eccentric disc, by a cam cut in the said plate.

Further characteristics will be specified in the following description with reference to the appended drawings which are given solely by way of example and in which:

Fig. 1 is an elevational view of the device from the interior of a trunk or chest in the opened position.

Fig. 2 is an elevational view of the same device in the fastened position.

Fig. 3 is a section on the line A—A of Figure 2, of the device in the fastened position.

In the form of construction herein represented, the device is supposed to be employed with a trunk or box, and consists of a metallic plate 1 which is secured to the main body of the trunk, box or support of the hood, or the like, and the said plate supports the whole device. It is pierced with a circular aperture in which is pivotally mounted a member 2 provided with wings. The said member serves to operate the fastening device. The said wings may be obviously replaced by a handle, a crank, a milled knob or other suitable device.

The member 2 is held in the plate 1 by a disc 3 which is riveted by means of the crank axle 4 and the rivet 5. The disc 3 is cut in such manner as to form two abutments $3a$ and $3b$ by which the said disc may make contact with the stud 6, which is riveted to the plate 1, either in the opened or fastened positions.

The crank axle 4 also serves for the pivoting of the end of the link 7 whose other end, through the medium of the stud 8 riveted to the ring 9, follows the outline of the cam 10 cut in the plate 1. A hook 11 is secured to the panel or door to be fastened.

A fibre washer 12 and a steel concave washer 13 provide for the correct operation of the device, without undesirable clearance between the parts. A small plate 14 inserted into the member 2 serves to conceal the rivets.

The operation is as follows:

The position shown in Figure 1 corresponds to the opened position; the hook 11, and hence the door, may be moved to the left. To close, the member 2 is turned through 180°, thus placing the device in the position shown in Figure 2. In this movement, the member 9, which follows the outline of the cam 10, engages the hook and thus draws it to the right until the axle 4 attains the dead centre. The disc 3 makes contact with the stud 6 at about 20° from this dead centre, so as to afford a reliable fastening of the door or the like.

It will be observed that by this device, which is of an inexpensive nature, I provide a fastening of the panel or door to be closed, or of the hood to be secured in place, which is easy to operate, and offers a most reliable closing of the parts.

Obviously, the invention is not limited to the details of construction herein described and represented which are given solely by way of example.

Having now described my invention what I claim as new and desire to secure by Letters Patent is:

In a locking device for trunks and the like, a hook secured to one panel of the trunk, a plate secured to a cooperating panel of the trunk and provided with a cam groove, a link pivoted to said latter panel, a stud carried by said link and engaging said groove and adapted to cooperate with said hook, means for manually operating said link and means for stopping said operating means after said link has overrun the dead centre of its course after said inter-engagement of said hook and stud.

In testimony whereof I have signed my name to this specification.

EMILE HENRI COQUILLE.